(12) United States Patent
Ukai

(10) Patent No.: US 7,643,787 B2
(45) Date of Patent: Jan. 5, 2010

(54) RECEIVER SYSTEM AND METHOD FOR RECEIVING BROADCASTING

(75) Inventor: Atsushi Ukai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 489 days.

(21) Appl. No.: 11/594,895

(22) Filed: Nov. 9, 2006

(65) Prior Publication Data

US 2007/0123164 A1 May 31, 2007

(30) Foreign Application Priority Data

Nov. 28, 2005 (JP) .............................. 2005-342406

(51) Int. Cl.
*H04Q 7/20* (2006.01)
(52) U.S. Cl. ..................... 455/3.02; 455/3.03; 455/3.04; 455/3.06; 455/3.01; 455/403; 725/62; 725/63; 725/68; 725/71; 725/72
(58) Field of Classification Search ................. 455/302, 455/301, 456.1–457, 427–429, 466, 414.1–414.4, 455/422.1, 403, 517, 500, 550.1, 552.1, 12.1, 455/15, 13.1; 725/62–68, 71, 72
See application file for complete search history.

(56) References Cited

U.S. PATENT DOCUMENTS

| 2005/0227739 A1* | 10/2005 | Dowling et al. | ............. 455/566 |
| 2006/0095349 A1* | 5/2006 | Morgan et al. | ................ 705/29 |
| 2008/0176510 A1* | 7/2008 | Yuhara et al. | ............. 455/3.02 |

FOREIGN PATENT DOCUMENTS

| JP | A-61-203733 | 9/1986 |
| JP | A-2003-091795 | 3/2003 |
| JP | A-2003-158690 | 5/2003 |
| JP | A-2004-184121 | 7/2004 |
| JP | A-2005-192167 | 7/2005 |

* cited by examiner

*Primary Examiner*—Keith T Ferguson
(74) *Attorney, Agent, or Firm*—Posz Law Group, PLC

(57) ABSTRACT

A receiver system equipped with a first and second reception units for receiving a satellite radio broadcasting prevents a reception unit switching operations by using signal selection data that provides satellite availability for respective operation areas. The satellite radio broadcasting reception quality in each of the respective operation areas is improved because of the reduced chance of dropout or the like in the broadcasted contents of the satellite radio broadcasting received by the receiver system.

6 Claims, 3 Drawing Sheets

SATELLITE AVAILABILITY TABLE

| AREA CODE | COORD. OF NE CORNER | COORD. OF SW CORNER | AVAILABILITY |
|---|---|---|---|
| 1001 | E134, N36 | E133, N35 | OK |
| 1002 | E133, N35 | E133, N34 | OK |
| 1003 | E132, N34 | E133, N33 | NG |

RECEIVER SYSTEM AND METHOD FOR RECEIVING BROADCASTING

CROSS REFERENCE TO RELATED APPLICATION

This application is based on and claims the benefit of priority of Japanese Patent Application No. 2005-342406 filed on Nov. 28, 2005, the disclosure of which is incorporated herein by reference.

FIELD OF THE INVENTION

The present invention generally relates to a receiver system that receives a signal from a communication satellite.

BACKGROUND OF THE INVENTION

In recent years, a satellite information service such as Global Positioning System or the like is widely available. In terms of utilization of the satellite information service, how a receiver can determine the positions of the satellites effortlessly is a key factor. Japanese patent application JP-A-2004-184121 discloses a process for determining the satellite position, that is, mask information is utilized to screen available satellites for speedy satellite selection.

As a variety of the satellite information service, satellite radio broadcasting is now gaining popularity. The satellite radio broadcasting broadcasts a radio signal from a geostationary satellite that receives a source signal from a ground station. The satellite radio broadcasting provides radio programs such as music programs, traffic information programs and the like for a coverage that extends to a much greater area in comparison to the conventional ground broadcasting such as FM broadcasting or the like.

The satellite radio broadcasting usually uses the geostationary satellites for broadcasting the radio signal, thereby providing for a user a relatively high readiness in terms of position determination in comparison to the positioning of GPS satellites. However, a satellite radio receiver suffers from a signal reception problem because the radio signal from the geostationary satellite is easily interrupted by a nearby building, an expressway on an elevated track or the like due to its straightness of propagation. In other words, continuation of service provision for the receiver in various conditions is a problem to be solved.

In an attempt for an increased coverage and improved quality in terms of the service provision without interruption, the satellite radio broadcasting broadcasts the same program from the ground station of the FM broadcasting as a supplemental service provision scheme. That is, when the receiver receiving the satellite radio broadcasting comes behind the nearby building or under the raised expressway track, the receiver prevents the interruption of the service provision of the satellite radio program by alternatively tuning to the FM broadcasting from the ground station.

In the above-described supplemental service provision scheme, the receiver of the satellite broadcasting still encounters a reception problem due to the time difference between the digital signal decryption for the satellite radio broadcasting signal and the analog signal decryption for the FM broadcasting. Further, the radio signal from the geostationary satellite transmits a far greater distance before being received by the receiver in comparison to the FM broadcasting. Therefore, even when the same program is sent out from a studio for broadcasting from both of the geostationary satellite and the ground station, the radio signal from the satellite and the radio signal from the FM station reach the receiver at respectively different times. As a result, the radio program may be interrupted even when the receiver switches from the satellite radio broadcasting to the FM broadcasting in order to avoid the reception problem. Furthermore, the reception switching time of the receiver may also contribute to an increase of the interruption time. Frequent switching of the broadcasting channel between the satellite and the ground station may further complicated the reception problem.

SUMMARY OF THE INVENTION

In view of the above-described and other problems, the present disclosure provides a receiver system that prevents deterioration of broadcasting service quality when the receiver system switches broadcasting channels between a broadcasting from a broadcast satellite and from an FM station on the ground.

The receiver system of the present disclosure includes a first receiver for receiving a first signal sent out from a communication satellite, a second receiver for receiving a second signal sent out from a ground facility, a signal selection data acquisition unit for acquiring signal selection data that controls selection of one of the first and second signals for broadcasting reception in a current operation area, and a control unit for controlling execution of a predetermined process that utilizes one of the first and second signals received by selecting one of the first receiver and the second receiver based on the signal selection data that is acquired by the signal selection data acquisition unit. In this case, the operation areas are defined based on municipalities such as a county or the like, or based on the coordinates such as the longitude and the latitude. In addition, the predetermined process is a process for demodulating the signal received by one of the two receivers and for outputting guidance voice or the like, or a process for extracting traffic information, weather information or the like from the signal. In this manner, the receiver system use the signal either from the satellite or the ground facility while the receiver system is in a certain operation area. Therefore, signal switching operation for switching signals from the first and the second receivers in the receiver system is prevented, thereby minimizing chances of broadcasted contents dropout due to the signal switching operation. In other words, the broadcasting service quality experienced by the user of the receiver system is kept from deteriorating by preventing the signal switching operation in each of the operation areas.

The signal selection data acquisition unit may acquire the signal selection data from another device, or may acquired and store the signal selection data in the acquisition unit by retrieving the data from a storage medium. Further, the storage medium may be installed in the receiver system, or may be separately installed from the receiver system.

The signal reception by the first receiver based on the signal selection data may lead to the reception failure depending on the accuracy of the signal selection data or the like. For example, a newly built high-rise building in a certain operation area that is not yet reflected on the signal selection data may lead to the reception failure by the first receiver. Therefore, the control unit records an unsuccessful execution attempt of the predetermined process that utilizes the first signal received by the first receiver due to a signal reception failure by the first receiver as an failure record in association with the current operation area at a time of the signal reception failure, and the control unit controls a succeeding execution of the predetermined process to utilize the second signal received by the second receiver when an attempt of the succeeding execution of the predetermined process takes place in the current operation area that is recorded as the failure record in association with the unsuccessful execution attempt of the predetermined process by utilizing the first signal. In this manner, the signal selection data is updated appropriately for reflecting a change of environment such as a construction of a new building. Therefore, the chance of deterioration of the broadcasting service quality is further reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present disclosure are described with reference to the drawings. Like parts have like numbers in each of the embodiments.

Figures 1, 2:
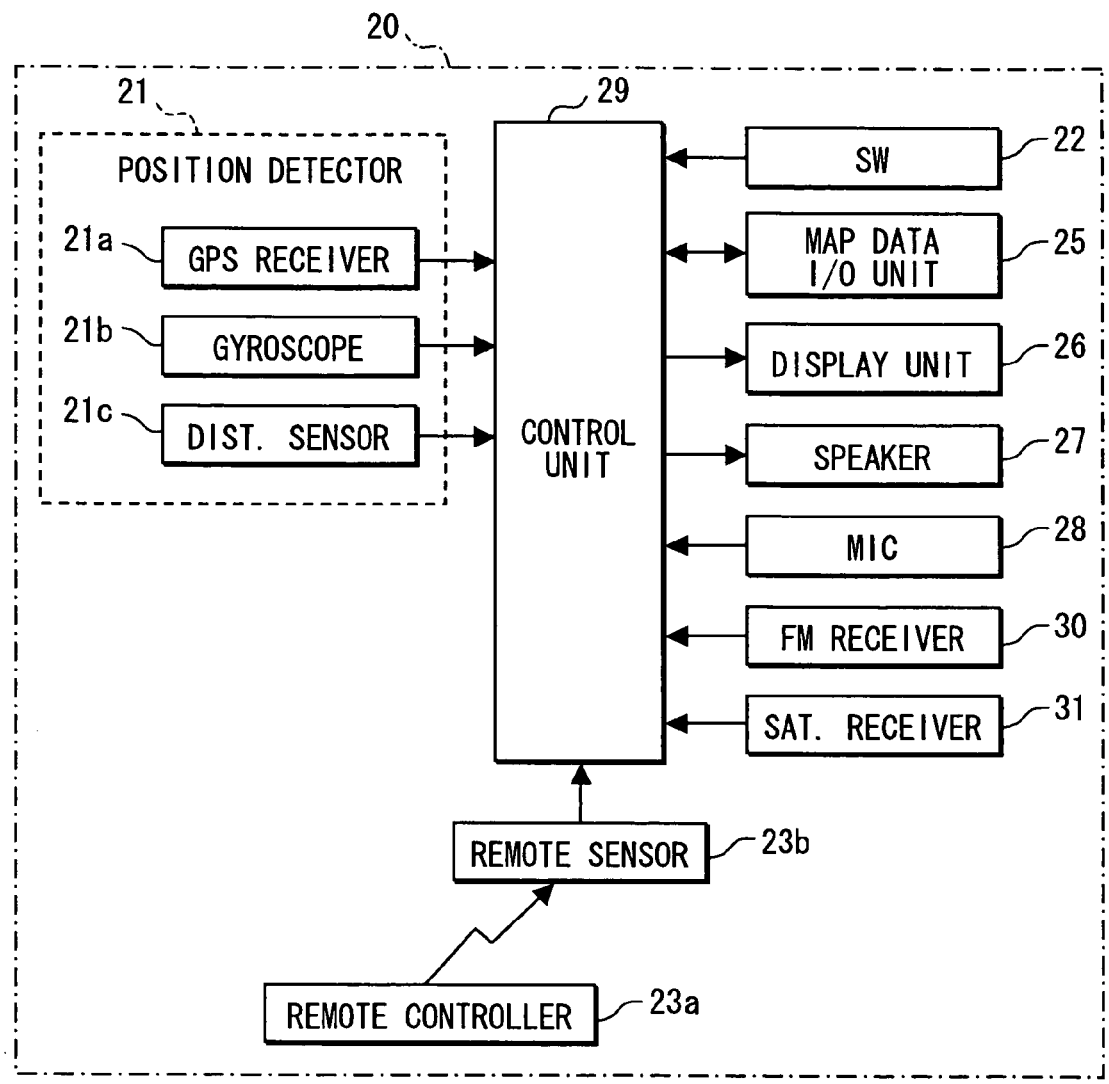
FIG. 1 shows a block diagram of a navigation system in an embodiment of the present disclosure.
FIG. 2 shows a diagram of a satellite availability table for use in the navigation system.

FIG. 1 shows a block diagram of a navigation system 20 in an embodiment of the present disclosure. The navigation system 20 includes a function of a receiver system of the present disclosure.

The navigation system 20 is installed in a vehicle, and includes a position detector 21 for detecting a current position of the vehicle, operation switches 22 for inputting various instructions from a user, a remote controller 23a in a separate body for inputting various instructions as the operation switches 22, a remote sensor 23b for receiving a signal from the remote controller 23a, a map data input/output unit 25 for inputting map data from map data storage medium that stores map data, sound data and the like, a display unit 26 for displaying a map and/or other information, a speaker 27 for outputting a voice guidance and the like, a microphone 28 for outputting an electric signal based on a user's voice, an FM receiver 30 for receive an FM broadcast, a satellite receiver 31 for receiving a satellite radio broadcast, and a control unit 29 that controls above components for executing various process.

The position detector 21 includes a GPS receiver 21a for receiving a radio wave from GPS satellites with a GPS antenna (not shown in the figure) and outputting a reception signal, a gyroscope 21b for detecting a rotation movement of the vehicle body, and a distance sensor 21c for detecting a travel distance of the vehicle based on an acceleration/deceleration in a front-rear direction. The control unit 29 calculates the current position, a travel direction, a speed and other condition of the vehicle based on the output from these sensors 21a to 21c and related devices. In this case, the current position of the vehicle is calculated based on the output of the reception signal from the GPS receiver 21a by using a point positioning method or a relative positioning method.

The operation switches 22 are disposed on, for example, the display unit 26 as touch switches, mechanical switches or the like. The touch switches are integrally disposed on a display screen of the display unit 26, and uses one of various detection methods such as a pressure sensing method, a electromagnetic induction method, a electrostatic capacitance method, and a combination of those methods.

The map data input/output unit 25 is used to input various data from the map data storage medium (not shown in the figure) such as a hard disk drive or the like, and to output the data to the storage medium. The map data storage medium stores the map data including node data, link data, cost data, background data, road data, name data, mark data, intersection data, facility data and the like as well as guidance voice data, voice recognition data, satellite availability data and the like. The data mentioned above may also be retrieved from other source through a communication network.

The display unit 26 is constructed by using, for example, a liquid crystal display, an organic EL display or the like, and is capable of displaying various colors. The display screen of the display unit 26 displays a current position mark of the vehicle at the current position on a map based on the signal from the position detector 21 and the map data from the map data input/output unit 25. The display screen also displays a navigation route toward a destination of a travel, a location name, a landmark, a facility mark or the like on top of the map. In addition, facility guidance information may also be displayed on the display screen.

The speaker 27 is used to output a radio broadcast voice, a guidance voice of the facility guidance information and the like that are inputted from the map data input/output unit 25.

The microphone 28 is used to input the user's voice, and then to output the electric signal (a sound signal) based on the inputted user's voice to the control unit 29. The user controls the navigation system 20 by inputting various voice instructions to the microphone 28.

The FM receiver 30 is coupled with an FM antenna (not shown in the figure), and is used to receive the FM broadcast wave for demodulating the signal contained therein.

The satellite receiver 31 is coupled with a satellite antenna (not shown in the figure), and is used to receive the satellite broadcast wave for demodulating the signal contained therein.

The control unit 29 is constructed by using a well-known type microcomputer having a CPU, a ROM, a RAM, an SRAM, an I/O and a bus line for interconnection of these parts. The control unit 29 executes various processes based on programs stored in a storage such as the ROM, the RAM and the like. For example, the control unit 29 executes a process for calculating the current position of the vehicle as a combination of the coordinates and the travel direction based on the signals such as position detection signals and the like and for displaying on the display unit 26 a map around the current position by utilizing the map data inputted from the map data input/output unit 25, a process for calculating an optimum route based on the map data stored in the map data input/output unit 25 and a destination specified by operating the operation switches 22, the remote controller 23a and the like, a process for providing a route navigation by displaying the optimum route on the display unit 26 and/or outputting the guidance voice from the speaker 27 and other related processes.

FIG. 2 shows a diagram of a satellite availability table for use in the navigation system 20. The satellite availability table is stored on the map data storage medium to be accessed by the map data input/output unit 25, and includes satellite availability data. The availability data is used in the following manner. That is, each of plural availability data records in the satellite availability table defines an area (a rectangular division in the map) in association with an area code, north east corner coordinates (a longitude and a latitude) of the area, south west corner coordinates (a longitude and a latitude) of the area, and the availability of the satellite radio broadcast in the area. The availability of the satellite radio broadcast in an area specifies one of OK or NG information. If the availability is specified as "OK," the vehicle can receive the satellite radio broadcast on any location on the road in the defined area. If the availability is specified as "NG," there is at least a portion of the road in the defined area where the vehicle cannot receive the satellite radio broadcast.

Figure 3:
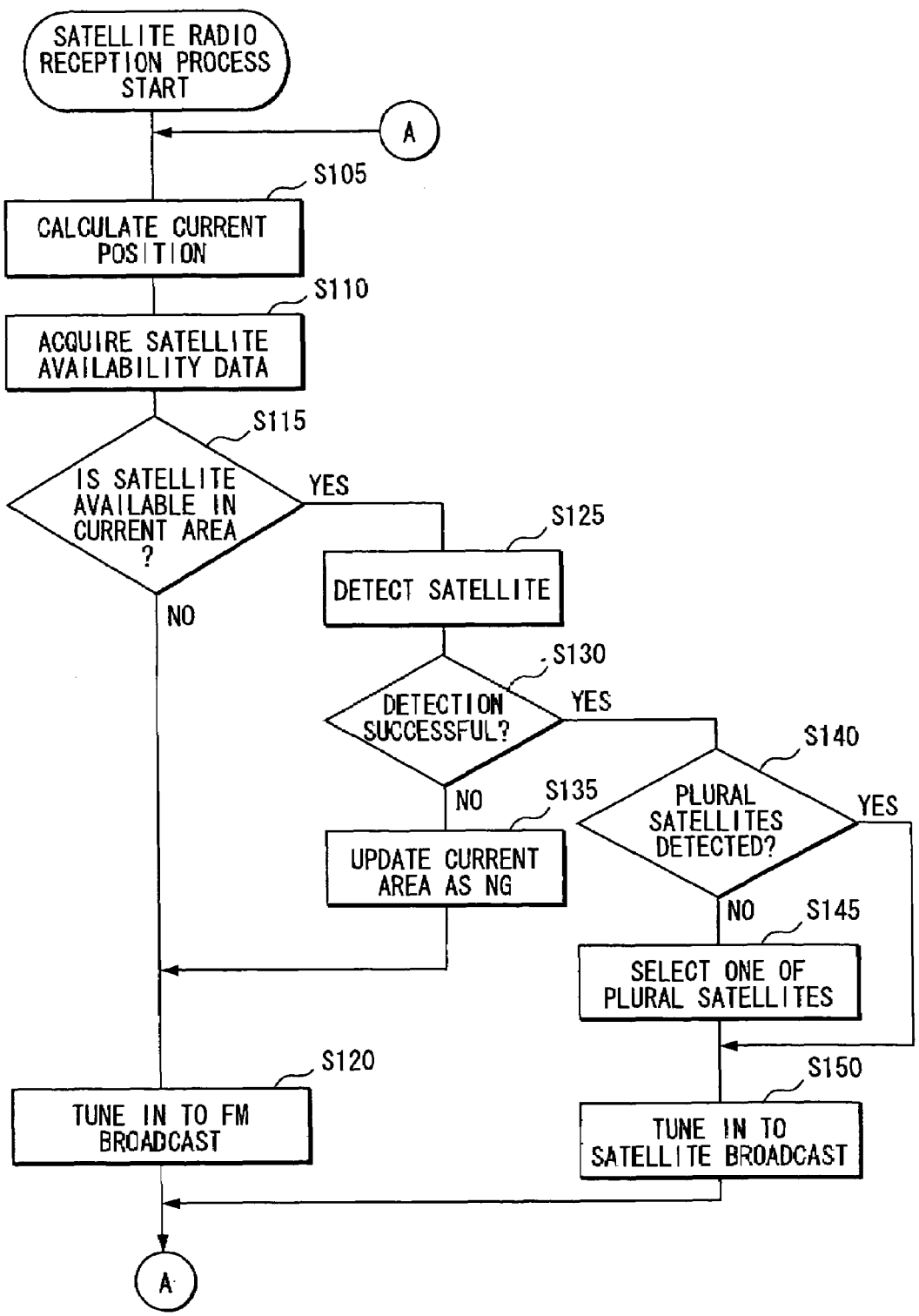
FIG. 3 shows a flowchart of a satellite radio reception process in the navigation system.

FIG. 3 shows a flowchart of a satellite radio reception process in the navigation system 20. Other processes in the navigation system 20 such as a route calculation process, a route guidance process or the like are well-known for the people in the art, thereby being omitted in the description of the present embodiment. The satellite radio reception process starts upon receiving an instruction of satellite radio reception from one of the operation switches 22 or the remote controller 23a after the navigation system 20 is turned on by receiving an electric power.

The control unit 29 executes the process for satellite radio reception.

In step S105, the process calculates the current position of the vehicle based on the signal derived from the position detector 21.

In step S110, the process acquires the satellite availability data from the data storage medium through the map data input/output unit 25.

In step S115, the process determines whether the satellite availability is OK or NG in the data. The process proceeds to step S125 when the availability is OK (step S115: YES). The process proceeds to step S120 when the availability is NG (step S115: NO).

In step S120, the process controls circuitry to output a signal received by the FM receiver 30 to the speaker 27. In addition, the process extracts traffic information from the signal received by the FM receiver 30 to be displayed on the display unit 26. The process returns to step S105 after step S120.

In step S125, the process detects a satellite based on satellite orbit information stored in the control unit 29.

In step S130, the process determines whether the satellite is detected. The process proceeds to step S140 when the satellite is detected (step S130: YES). The process proceeds to step S135 when the satellite is not detected (step S130: NO).

In step S135, the process updates the satellite availability data on the storage medium as NG by sending the data through the map data input/output unit 25. The process returns to step S120 after step S135.

In step S140, the process determines whether plural satellites are detected. The process proceeds to step S150 when the plural satellites are detected (step S140: YES). The process proceeds to step S145 when the plural satellites are not detected, that is, when only one satellites is detected (step S140: NO).

In step S145, the process selects one of the plural satellites for maximum availability. That is, for example, the process evaluates and selects one of the satellites based on an elevation angle for avoiding interruption by man-made structures such as a high-rise building or the like and for best visibility from the vehicle. The process proceeds to step S150 after step S145.

In step S150, the process controls circuitry to demodulate the signal received by the satellite receiver 31 for outputting it to the speaker 27 after D/A conversion. In addition, the process extracts the traffic information from the signal received by the satellite receiver 31 to be displayed on the display unit 26. The process returns to step S105 after step S150.

Figure 4:
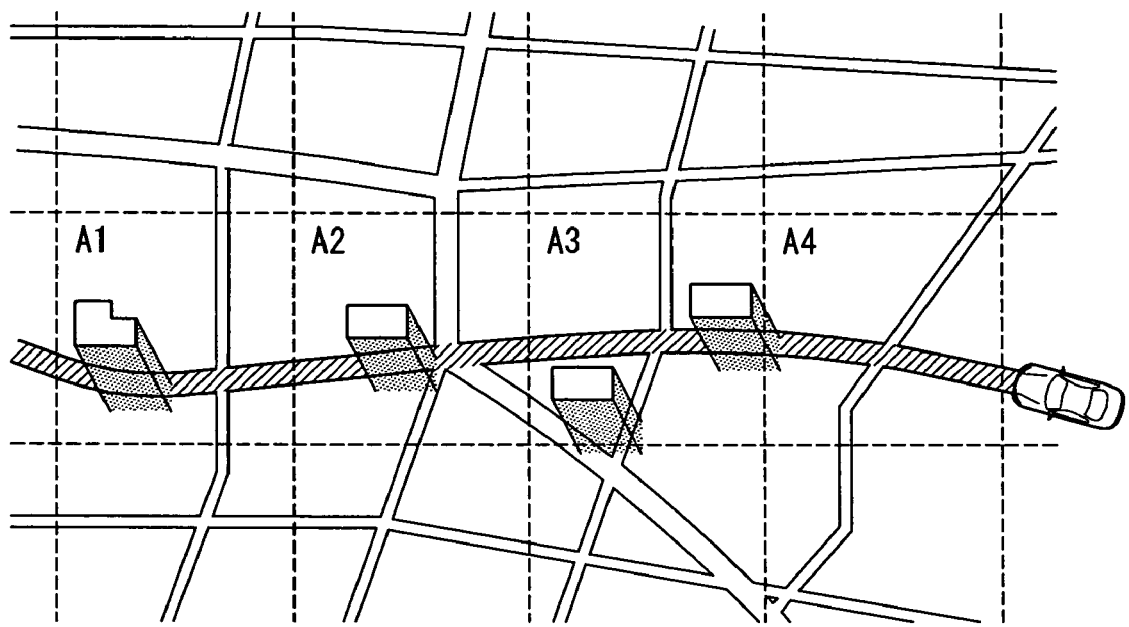
FIG. 4 shows an illustration of satellite radio reception in a real life situation.

FIG. 4 shows an illustration of satellite radio reception in a real life situation.

Let's assume that all of the areas A1 to A4 are in a coverage by a satellite for the satellite radio broadcast, but a part of the navigation route in the areas A1, A2, and A3 are blocked in terms of the satellite radio reception due to the high-rise buildings in a downtown district. That is, the satellite availability in the areas A1 to A3 is NG, while the availability in the area A4 is OK.

Now, the vehicle having the navigation system 20 is assumed to travel from the area A4 toward the area A1 through the areas A3 and A2. The vehicle tunes in to the satellite broadcast by using the signal received by the satellite receiver 31 while traveling in the area A4, and then switches to the FM broadcast by tuning to the signal received by the FM receiver 30 when the vehicle proceeds to the area A3. The navigation system 20 keeps tuning in to the FM broadcast by using the signal received by the FM receiver 30 even when the satellite is visible between the high-rise buildings while the vehicle is traveling in the areas A3, A2, and A1.

Therefore, while the vehicle is traveling in the areas A3, A2, and A1, the signal is not switched from the FM broadcast to the satellite broadcast, thereby providing an improved reception condition in comparison to a conventional switching scheme that suffers from interruption of the reception by frequent switching in the above-described situation.

Further, when a newly built building in the area A4 causes interruption of the satellite radio reception on a portion of the road in the area A4, the navigation system 20 in the vehicle updates a record of the satellite availability data to have NG attribute upon detecting satellite unavailability in the course of travel in the area A4 as described as the process in steps S130 and S135 in the flowchart described above. In this manner, the reception of the satellite radio broadcast in the area A4 will not be interrupted in the succeeding travel of the road in the area A4.

Although the present disclosure has been fully described in connection with the preferred embodiment thereof with reference to the accompanying drawings, it is to be noted that various changes and modifications will become apparent to those skilled in the art.

For example, the navigation system 20 having the satellite radio reception function may be used in a ship or other type of vehicle instead of an automobile for use on a ground.

Such changes and modifications are to be understood as being within the scope of the present disclosure as defined by the appended claims.

What is claimed is:

1. A receiver system of broadcasting in an operation area comprising:
    a first receiver for receiving a first signal sent out from a satellite;
    a second receiver for receiving the second signal sent out from a ground facility;
    a signal selection data acquisition unit for acquiring signal selection data that controls selection of one of the first and second signals for broadcasting reception in a current operation area; and
    a control unit for controlling execution of a predetermined process that utilizes ones of the first and second signals based on the signal selection data that is acquired by the signal selection data acquisition unit,
    wherein when a selected one of the first and second signals is utilized, the control unit is configured to continue to utilize the selected signal throughout the current operation area until the selected signal cannot be acquired, regardless of whether later signal selection data indicates a non-selected signal to be preferable to the selected signal.

2. The receiver system as in claim 1, wherein the signal selection data acquisition unit acquires the signal selection data by retrieving the signal selection data from a data storage medium based on a current operation area.

3. The receiver system as in claim 1, wherein the control unit records an unsuccessful execution attempt of the predetermined process that utilizes the first signal due to a signal reception failure by the first receiver as an failure record in association with a current operation area at a time of the signal reception failure; and the control unit controls a succeeding executed of the predetermined process to utilize the second signal when an attempt of the succeeding execution of the predetermined process takes place in the current operation area that is recorded as the failure record in association with the unsuccessful execution attempt of the predetermined process by utilizing the first signal.

4. A method for receiving a broadcast signal for use in a receiver system in an operation area comprising:

providing a first receiver for receiving a first signal sent out from a satellite;

providing a second receiver for receiving a second signal sent out from a ground facility;

providing a signal selection data acquisition unit for acquiring signal selection data that controls selection of one of the first and second signals to operate the receiver system in a current operation area;

providing a control unit for controlling execution of a predetermined process that utilizes one of the first and second signals by selecting one of the first receiver and the second receiver based on the signal selection data that is acquired by the signal selection data acquisition unit; and continuing to utilize the selected signal throughout the current operation area until the selected signal cannot be acquired, regardless of whether later signal selection data indicates a non-selected signal to be preferable to the selected signal.

5. The method as in claim 4, wherein the signal selection data acquisition unit acquires the signal selection data by retrieving the signal selection data from a data storage medium based on the current operation area.

6. The method as in claim 4, wherein the control unit records an unsuccessful execution attempt of the predetermined process that utilizes the first signal due to a signal reception failure by the first receiver as an failure record in association with the current operation area at a time of the signal reception failure, and the control unit controls a succeeding execution of the predetermined process to utilize the second signal when an attempt of the succeeding execution of the predetermined process takes place in the current operation area that is recorded as the failure record in association with the unsuccessful execution attempt of the predetermined process by utilizing the first signal.

* * * * *